(12) United States Patent
Hung et al.

(10) Patent No.: US 11,106,282 B2
(45) Date of Patent: Aug. 31, 2021

(54) MOBILE DEVICE AND CONTROL METHOD THEREOF

(71) Applicant: HTC Corporation, Taoyuan (TW)

(72) Inventors: Yu-Kai Hung, Taoyuan (TW); I-Jui Chang, Taoyuan (TW); Jhao-Yin Li, Taoyuan (TW); Wen-Yu Weng, Taoyuan (TW); Yu-Ta Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 194 days.

(21) Appl. No.: 16/388,884

(22) Filed: Apr. 19, 2019

(65) Prior Publication Data

US 2020/0333886 A1    Oct. 22, 2020

(51) Int. Cl.
*G06F 3/01*      (2006.01)
*H04M 1/725*     (2021.01)
*H04M 1/72454*   (2021.01)

(52) U.S. Cl.
CPC ........ *G06F 3/017* (2013.01); *H04M 1/72454* (2021.01)

(58) Field of Classification Search
None
See application file for complete search history.

(56) References Cited

U.S. PATENT DOCUMENTS

| 2014/0184519 | A1* | 7/2014 | Benchenaa | G06F 1/1626 345/173 |
| 2015/0331569 | A1* | 11/2015 | Kang | G06F 3/0304 715/765 |
| 2016/0104401 | A1* | 4/2016 | Ko | G09G 3/006 345/214 |
| 2016/0179338 | A1* | 6/2016 | Miller | G06F 3/04883 345/174 |
| 2018/0081524 | A1 | 3/2018 | Gao et al. | |

FOREIGN PATENT DOCUMENTS

| CN | 104731339 A | 6/2015 |
| CN | 104735256 A | 6/2015 |
| TW | 201711010 A | 3/2017 |
| TW | 201732519 A | 9/2017 |

OTHER PUBLICATIONS

Corresponding Taiwan office action dated Dec. 16, 2020.

* cited by examiner

*Primary Examiner* — Krishna P Neupane
(74) *Attorney, Agent, or Firm* — CKC & Partners Co., LLC

(57) ABSTRACT

A mobile device includes sensors and a processor. The sensors are disposed on opposite edges of the mobile device respectively. The processor is configured to collect a first data set labeled with a right hand holding gesture, collect a second data set labeled with a left hand holding gesture, establish a determination model associated with the first data set and the second data set, and in response to the processor collects a third data set comprising the holding positions and the force values detected by the sensor, determine a current holding gesture according to the third data set in reference to the determination model.

18 Claims, 13 Drawing Sheets

| T0 | T1 | T2 | T3 | T4 |
|----|----|----|----|----|
| D11 | D21 | D31 | D41 | D51 |
| D12 | D22 | D32 | D42 | D52 |
| D13 | D23 | D33 | D43 | D53 |
| D14 | D24 | D34 | D44 | D54 |
| D15 | D25 | D35 | D45 | D55 |
| D16 | D26 | D36 | D46 | D56 |
| D17 | D27 | D37 | D47 | D57 |
| D18 | D28 | D38 | D48 | D58 |
| R11 | R21 | R31 | R41 | R51 |
| R12 | R22 | R32 | R42 | R52 |
| R13 | R23 | R33 | R43 | R53 |
| A11 | A21 | A31 | A41 | A51 |
| A12 | A22 | A32 | A42 | A52 |
| A13 | A23 | A33 | A43 | A53 |

MOBILE DEVICE AND CONTROL METHOD THEREOF

BACKGROUND

Technical Field

The present disclosure relates to a mobile device. More particularly, the present disclosure relates to an automatically gesture detection of the mobile device.

Description of Related Art

Due to the characteristics of using a shortcut menu on a mobile device easily, a traditional method is to put the shortcut menu near an edge of the mobile device. However, although this method improve the efficiency of using the shortcut menu, it is still inconvenient when the shortcut menu appears on an opposite side of user's thumb.

Therefore, how to solve the issue is very important nowadays.

SUMMARY

The disclosure provides a mobile device. The mobile device includes sensors, a memory and a processor. The sensors are disposed on opposite edges of the mobile device respectively. Each of the sensors is configured to detect a plurality of holding positions and a plurality of force values located on each of the holding positions. The memory is configured to store a determination model generated from a first data set labeled with a right hand holding gesture and a second data set labeled with a left hand holding gesture. The first data set includes the holding positions and the force values detected by the sensors corresponding to the mobile device being held in a right hand. The second data set includes the holding positions and the force values detected by the sensors corresponding to the mobile device being held in a left hand. The processor is coupled to the sensors. The processor is configured to collect a current detection data comprising the holding positions and the force values by the sensors. The processor is further configured to determine a current holding gesture and correspondingly perform a predefined function according to the current detection data in reference to the determination model.

The disclosure also provides a control method, which is suitable for a mobile device including a plurality of sensors disposed on at least two edges of the mobile device. The sensors are disposed on different positions on the edges. The control method includes following steps. Holding positions and force values located on each of the holding positions are sensed by the sensors. Current detection data including the holding positions and the force values are collected by the sensors. A current holding gesture is determined and correspondingly a predefined function is performed according to the current detection data in reference to a determination model. The determination model is generated from a first data set labeled with a right hand holding gesture and a second data set labeled with a left hand holding gesture, the first data set comprising the holding positions and the force values detected by the sensors corresponding to the mobile device being held in a right hand, the second data set comprising the holding positions and the force values detected by the sensors corresponding to the mobile device being held in a left hand.

Through the operations of embodiments described above, a shortcut menu can be dynamically shown near user's thumb on the display of the mobile device for convenience use.

It is to be understood that both the foregoing general description and the following detailed description are demonstrated by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
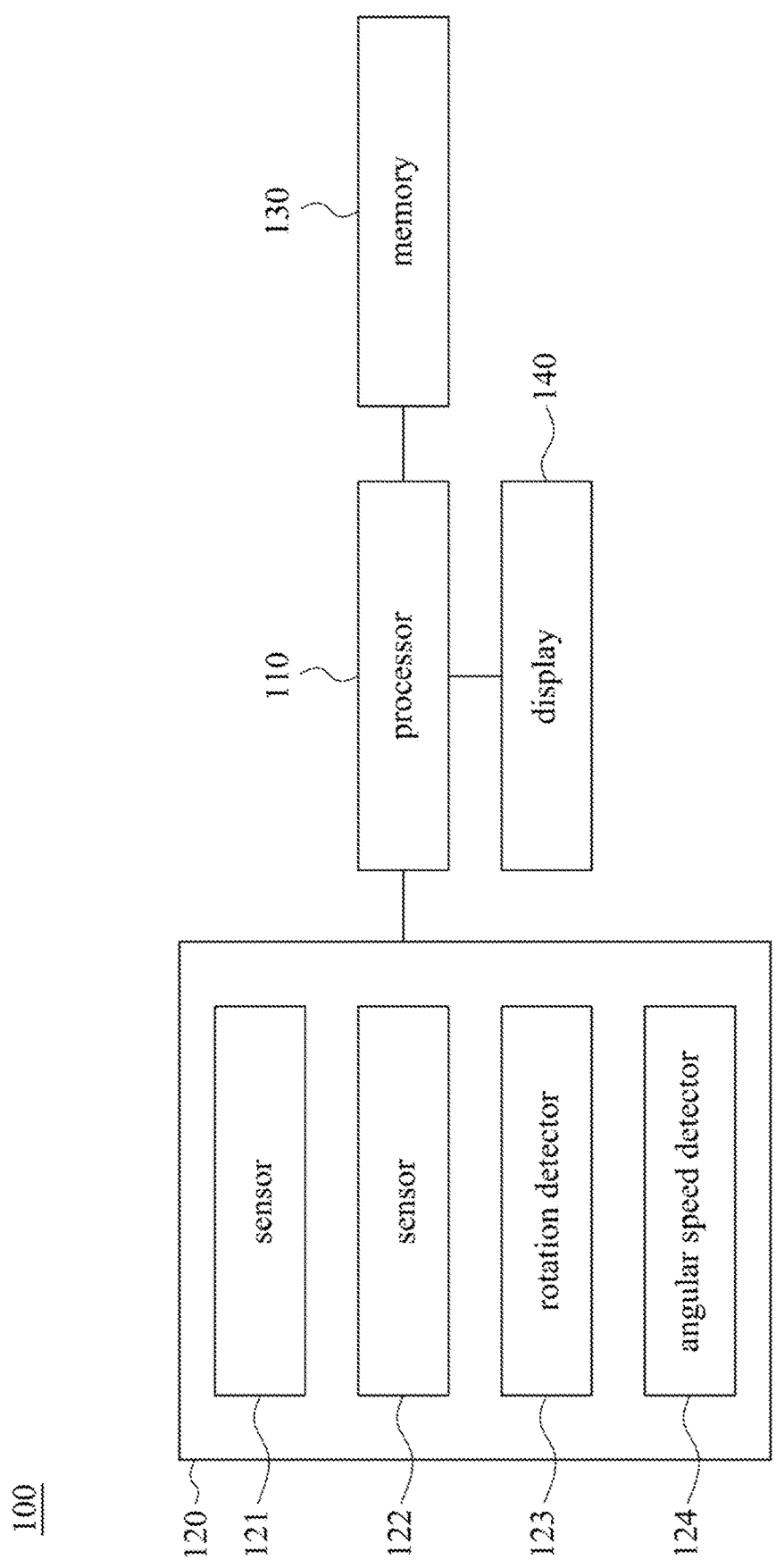
FIG. 1 is a schematic diagram illustrating a mobile device according to one embodiment of the disclosure.

Reference will now be made in detail to the present embodiments of the disclosure, examples of which are illustrated in the accompanying drawings. Wherever possible, the same reference numbers are used in the drawings and the description to refer to the same or similar parts.

It will be understood that, although the terms first, second, third etc. may be used herein to describe various elements, components and/or sections, these elements, components and/or sections should not be limited by these terms. These terms are only used to distinguish one element, component or section from another element, component or section. Thus, a first element, component or section discussed below could be termed a second element, component or section without departing from the teachings of the present disclosure.

Referring to FIG. 1, which is a schematic diagram illustrating a mobile device 100 according to one embodiment of the disclosure. The mobile device 100 includes a processor 110, a sensing module 120, a memory 130 and a display 140, in which the processor 110 is coupled to the sensing module 120, the memory 130 and the display 140. In an embodiment, the mobile device 100 can be a smartphone, a personal digital assistant, a wearable device (e.g., a smart watch) or any equivalent mobile device small enough to hold and operate in the hand.

In some embodiments, the sensing module 120 is configured to detect a hand holding gesture and generate a plurality of data corresponding to the hand holding gesture, in which the hand holding gesture is made by a user to trigger a certain function (e.g., a predefined interface) operated by the mobile device 100. In some embodiments, the data corresponding to the hand holding gesture includes, but not limited to, a plurality of hand holding positions, a plurality of force values, a plurality of rotation angles, and a plurality of angular speeds.

In some embodiments, the sensing module 120 includes a sensor 121 and another sensor 122 as shown in FIG. 1. The sensor 121 and the sensor 122 can be configured to respectively sense readings of a pressure force applied on a sensing area of the sensor 121 and the sensor 121.

Figure 2B:
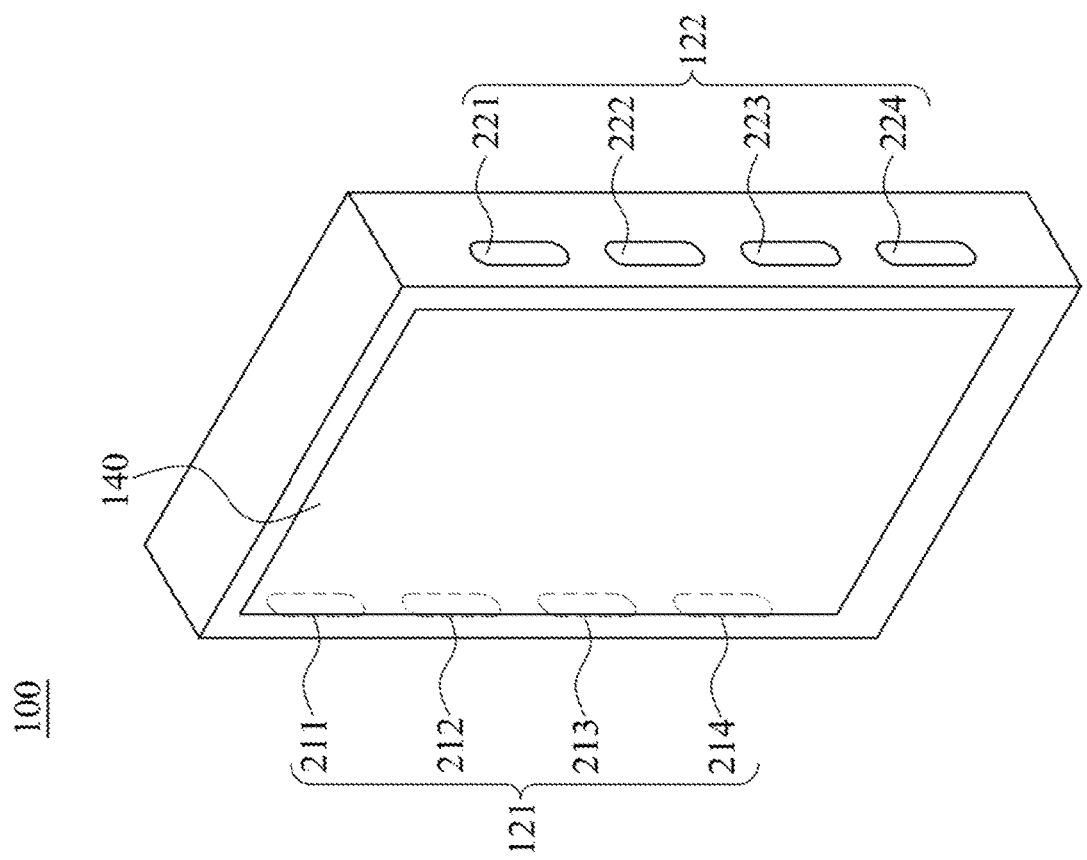
FIG. 2B is an exemplary mobile device including a plurality of sensors according to one embodiment of the disclosure.
Figure 2A:
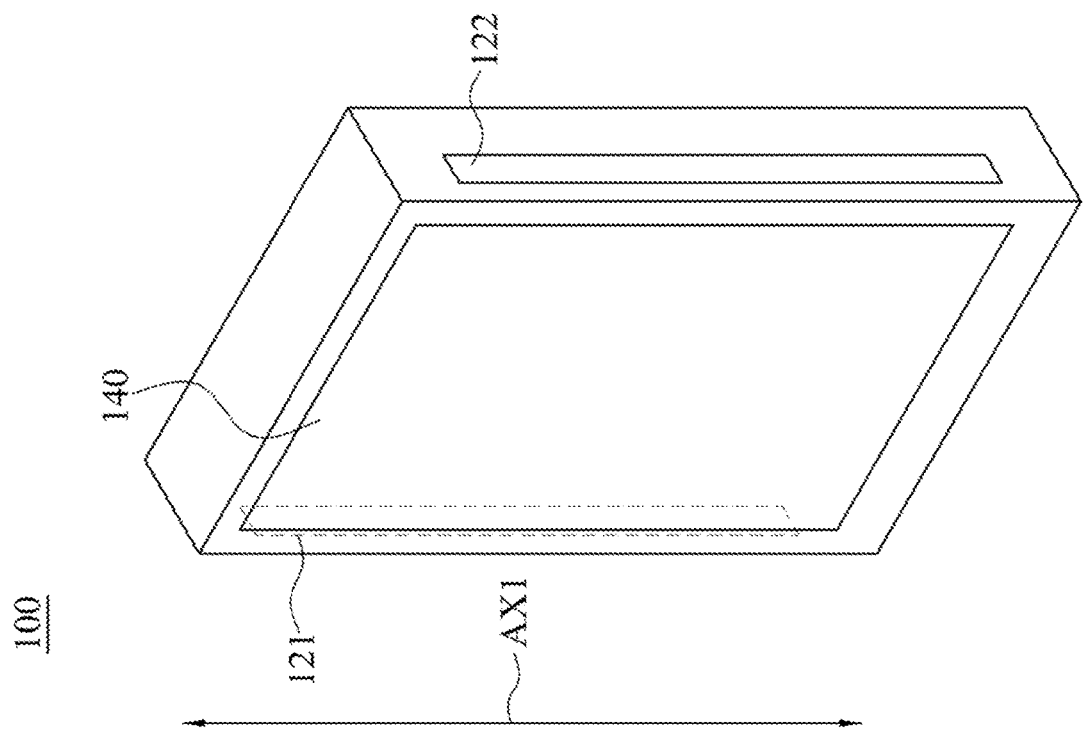
FIG. 2A is an exemplary mobile device including two sensors according to one embodiment of the disclosure.

FIG. 2A is a schematic diagram illustrating a mobile device 100 including two sensors 121 and 122 according to one embodiment of the disclosure. As shown in FIG. 2A, the sensor 121 is disposed on the left lateral surface of the mobile device 100. The sensor 122 is disposed on the right lateral side of the mobile device 100. In this embodiment, the sensor 121 is able to sense different force values at different holding positions on the left lateral side of the mobile device 100 along a first axis AX1. In this embodiment, the sensor 122 is able to sense different force values at different holding positions on the right lateral side of the mobile device 100 along the first axis AX1.

Figure 3A:
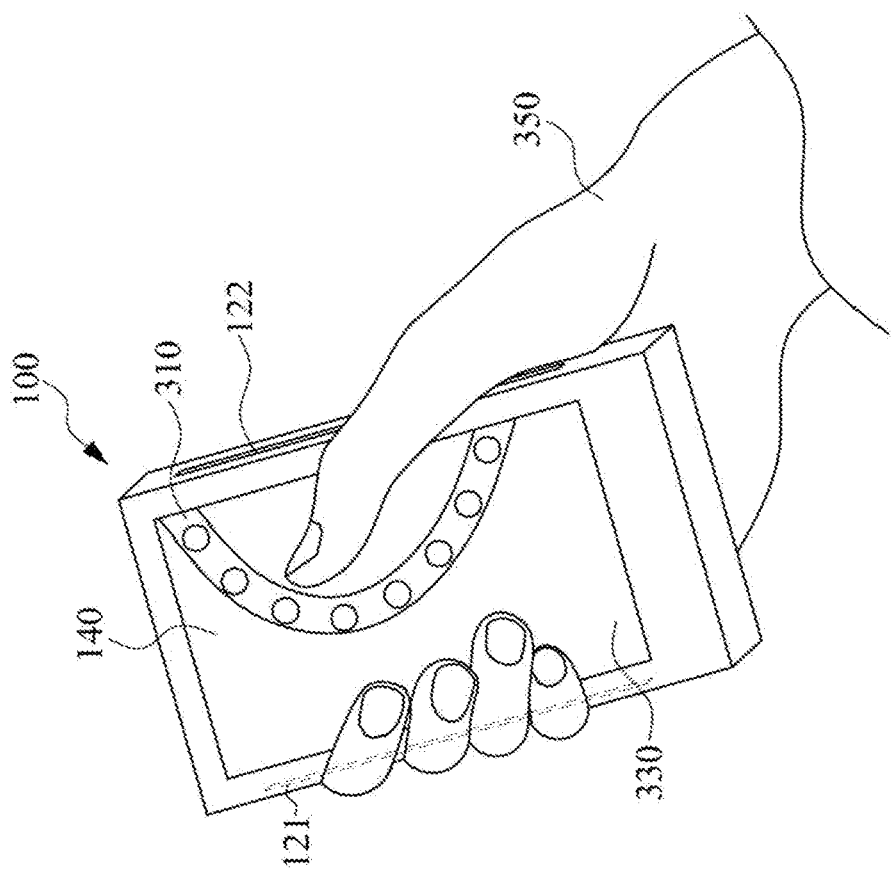
FIG. 3A is a schematic diagram illustrating the mobile device holding with a left-hand gesture in a demonstrational example.
Figure 3B:
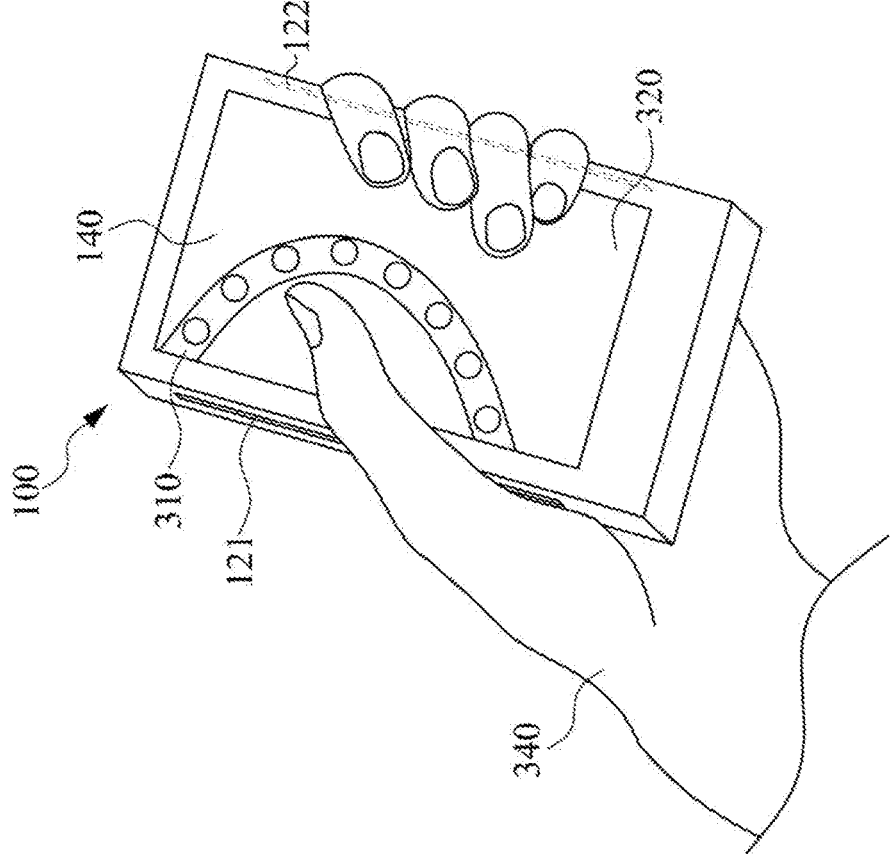
FIG. 3B is a schematic diagram illustrating the mobile device holding with a right-hand gesture in a demonstrational example.

Referring to FIG. 3A and FIG. 3B, FIG. 3A is a schematic diagram illustrating the mobile device 100 held by a left hand 340 of a user. FIG. 3B is another schematic diagram illustrating the mobile device 100 held by a right hand 350 of a user. When the mobile device 100 is held by the left hand 340 or the right hand 350, the sensor 121 and the sensor 122 in FIG. 2A will detect holding positions and force values on these holding positions.

Referring to FIG. 2A and FIG. 3A, when the mobile device 100 is held in the left hand 340 as shown in FIG. 3A, the sensor 121 may detect a holding position corresponding to the left thumb (or the web) of the left hand 340 and a corresponding force value on the holding position. In the meantime, the sensor 122 may detect four holding positions corresponding to four finger tips (e.g., the point finger, the middle finger, the ring finger and the pinky finger) of the left hand 340 and the force values on these holding positions.

Referring to FIG. 2A and FIG. 3B, when the mobile device 100 is held in the right hand 350 as shown in FIG. 3B, the sensor 121 may detect holding positions corresponding to four finger tips (e.g., the point finger, the middle finger, the ring finger and the pinky finger) of the right hand 350 and the force values on these holding positions. In the meantime, the sensor 122 may detect the right thumb (or the web) of the right hand 340 and a corresponding force value on the holding position.

In the embodiments, the sensor 121 and the sensor 122 are capable to detect one or multiple holding positions at the same time, and feedback one or more coordinates of the holding positions along the first axis AX1 to the processor 110.

However, the sensor 121 and the sensor 122 are not limited to be disposed as illustrated in FIG. 2A. Various mobile devices with pressure sensors disposed on at least two lateral edges of the mobile device 100 are within the contemplated scope of the present disclosure.

FIG. 2B is a schematic diagram illustrating the mobile device 100 in another embodiment of the disclosure. In FIG. 2B, the sensor 121 includes four pressure sensing pads 211, 212, 213 and 214, which are disposed on the left lateral surface of the mobile device 100 for individually sensing force values at different holding positions on the left lateral side of the mobile device 100. The sensor 122 includes four pressure sensing pads 221, 222, 223 and 224, which are disposed on the right lateral side of the mobile device 100 for individually sensing force values at different holding positions on the right lateral side of the mobile device 100.

Compared to the sensor 121 and the sensor 122 of the mobile device 100 in FIG. 2A, the pressure sensing pads 211-214 or 221-224 can be manufactured with low-cost pressure sensing components.

In some embodiments, the memory 130 is configured to store a determination model generated from a first data set and a second data set. The first data set is related to a gesture of a right hand holding the mobile device 100 and the second data set is related to a gesture of a left hand holding the mobile device 100. In some embodiments, each data in the first data set and the second data set can be represented by a figure, a matrix, a value and so on.

In some embodiments, the memory 130 can be realized by, for example, a read-only memory (ROM), a flash memory, a floppy disk, a hard disk, an optical disc, a flash disk, a flash drive, a tape, a database accessible from a network, or any storage medium with the same functionality that can be contemplated by persons of ordinary skill in the art.

In some embodiments, the processor 110 is configured to run or execute various software programs and/or sets of instructions to perform various functions to process data. In some embodiments, the processor 110 is configured to compare the data corresponding to the hand holding gesture obtained from the sensing module 120 with the first data and the second data obtained from the memory 130, and recognize a left-right status about whether the hand holding gesture is the left-hand gesture or the right-hand gesture according to the comparison result. In some embodiments, the processor 110 can be realized by, for example, one or more processors, such as central processors and/or microprocessors, but are not limited in this exemplar. In some embodiments, the processor can be realized by software programs, firmware and/or hardware circuits based on a learning model. The learning model includes, but not limited to, a logistic regression (LR) model, a support vector machine (SVM) model and a random forest model.

In some embodiments, the display 140 is configured to display a predefined interface on the side of the display 140 of the mobile device 100 according to the left-right status determined by the processor 110. For example, when the processor 110 determines that the hand holding gesture is related to the left-hand gesture, the display 140 displays the predefined interface on the left side of the display 140. When the processor 110 determines that the hand holding gesture is related to the right-hand gesture, the display 140 displays the predefined interface on the right side of the display 140. In an embodiment, the display 140 can include a display panel (e.g., a LCD display panel or a LED display panel) or a touchscreen.

In some embodiments, the predefined interface includes, but not limited to, an edge launcher with a plurality of shortcuts, a shortcut menu, or/and a keyboard. In some embodiment, the mobile device 100 is able to perform a certain function according to the left-right status. For example, when the user raise the mobile device 100 in his/her right hand, the mobile device 100 activates a phone-calling function; when the user raise the mobile device 100 in his/her left hand, the mobile device 100 activates a selfie shooting function. Various functions, applications in the mobile device 100 are within the contemplated scope of the present disclosure.

In some embodiments, as shown in FIG. 1, the sensing module 120 includes a sensor 121, a sensor 122, a rotation detector 123 and an angular speed detector 124. The sensor 121 and the sensor 122 are configured to sense the holding positions corresponding to the hand holding gesture and the force values corresponding to the holding positions, in which each of the force values represents a detected pressure at one of the holding positions. The rotation detector 123 is configured to detect rotation angles of the mobile device 100 along different axes. The angular speed detector 124 is configured to detect the rotation angular speeds of the mobile device 100 along different axes. In detail, the sensor 121 and the sensor 122 is configured to sense holding positions on the two edges and the force values of the holding position, the rotation detector 123 is configured to detects the rotation angles generated by the hand holding gesture, and the angular speed detector 124 is configured to detect the rotation angular speeds while holding the mobile device 100.

In some embodiments, each of the sensor 121 and the sensor 122 can be realized by a capacitive sensor, a resistive sensor, a piezoelectric sensor, an electromagnetic sensor, other type of pressure/force sensors, or a combination of aforesaid sensors, the rotation detector 123 can be realized by a magnetometer or a compass, and the angular speed detector 124 can be realized by a gyroscope. In some embodiments, the rotation detector 123 and the angular speed detector 124 can be integrated and implemented as an Inertial Measurement Unit (IMU), which can be a combination a magnetometer, a gyroscope and an acceleration meter.

In some embodiments, the mobile device 100 can be realized by a mobile device 100 shown in FIG. 2A or a mobile device 100 shown in FIG. 2B. Various mobile devices with sensors on at least two edges of the mobile device 100 are within the contemplated scope of the present disclosure.

As shown in FIG. 3A, the mobile device 100 is held by the left hand 340 in the left-hand gesture, such that a predefined interface 310 is shown on the left side of the display 140 of the mobile device 100 as the first pattern 320.

As shown in FIG. 3B, the mobile device 100 is held by the right hand 350 in the right-hand gesture, such that the predefined interface 310 is shown on the right side of the display 140 of the mobile device 100 as the second pattern 330.

According to FIG. 3A and FIG. 3B, the predefined interface 310 shown on a certain side is related to the left-right status, in which the left-right status is about whether the hand holding gesture is the left-hand gesture or the right-hand gesture. In other words, the predefined interface 310 is shown near user's thumb for accessing the predefined interface 310 more conveniently.

Figure 4B:
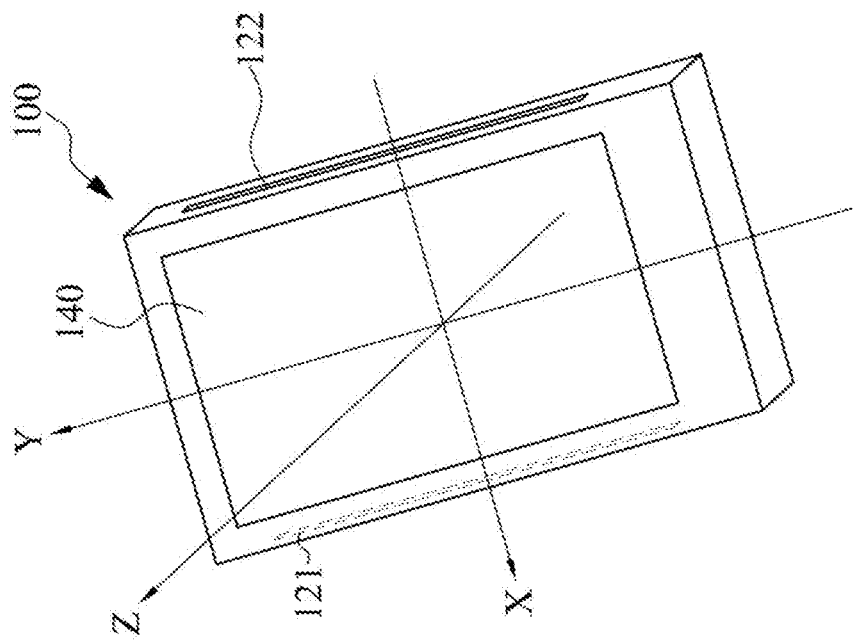
FIG. 4B is a schematic diagram illustrating the three axes of the mobile device in FIG. 3B according to one embodiment of this disclosure.
Figure 4A:
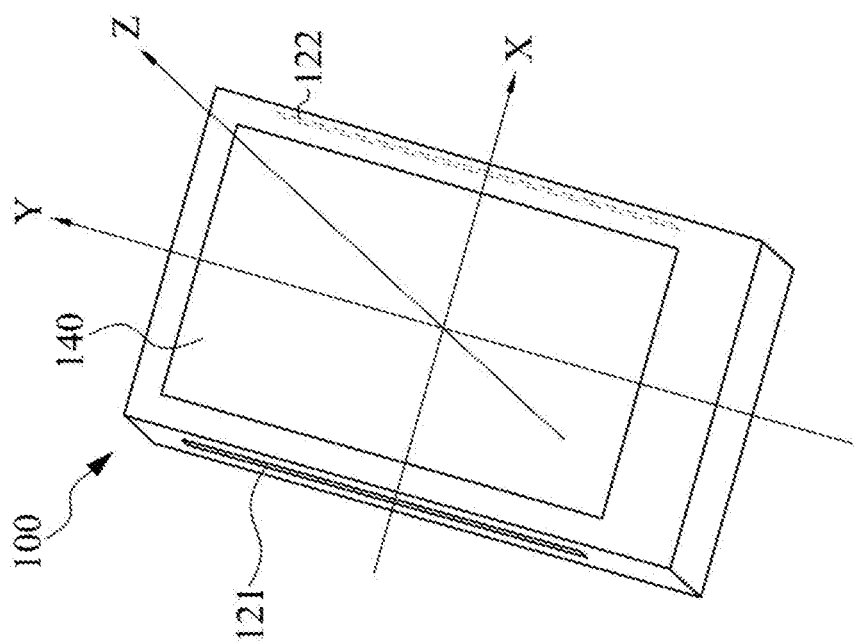
FIG. 4A is a schematic diagram illustrating the three axes of the mobile device in FIG. 3A according to one embodiment of this disclosure.

In some embodiments, the rotation angles include a first rotation angle, a second rotation angle and a third rotation angle. As shown in FIG. 4A and FIG. 4B, FIG. 4A is a schematic diagram illustrating the three axes of the mobile device 100 in FIG. 3A according to one embodiment of this disclosure and FIG. 4B is a schematic diagram illustrating the three axes of the mobile device 100 in FIG. 3B according to one embodiment of this disclosure. The first rotation angle, the second rotation angle and the third rotation angle correspond to the rotation angle of the mobile device 100 along an X axis, a Y axis and a Z axis of the mobile device 100 respectively. As shown in FIG. 4A and FIG. 4B, the X axis of the mobile device 100 is horizontal to the display 140 of the mobile device 100 and points to the right, the Y axis is horizontal to the display 140 of the mobile device 100 and points up, and the Z axis is vertical to the display 140 of the mobile device 100 and points outside of the display 140.

Figure 5:
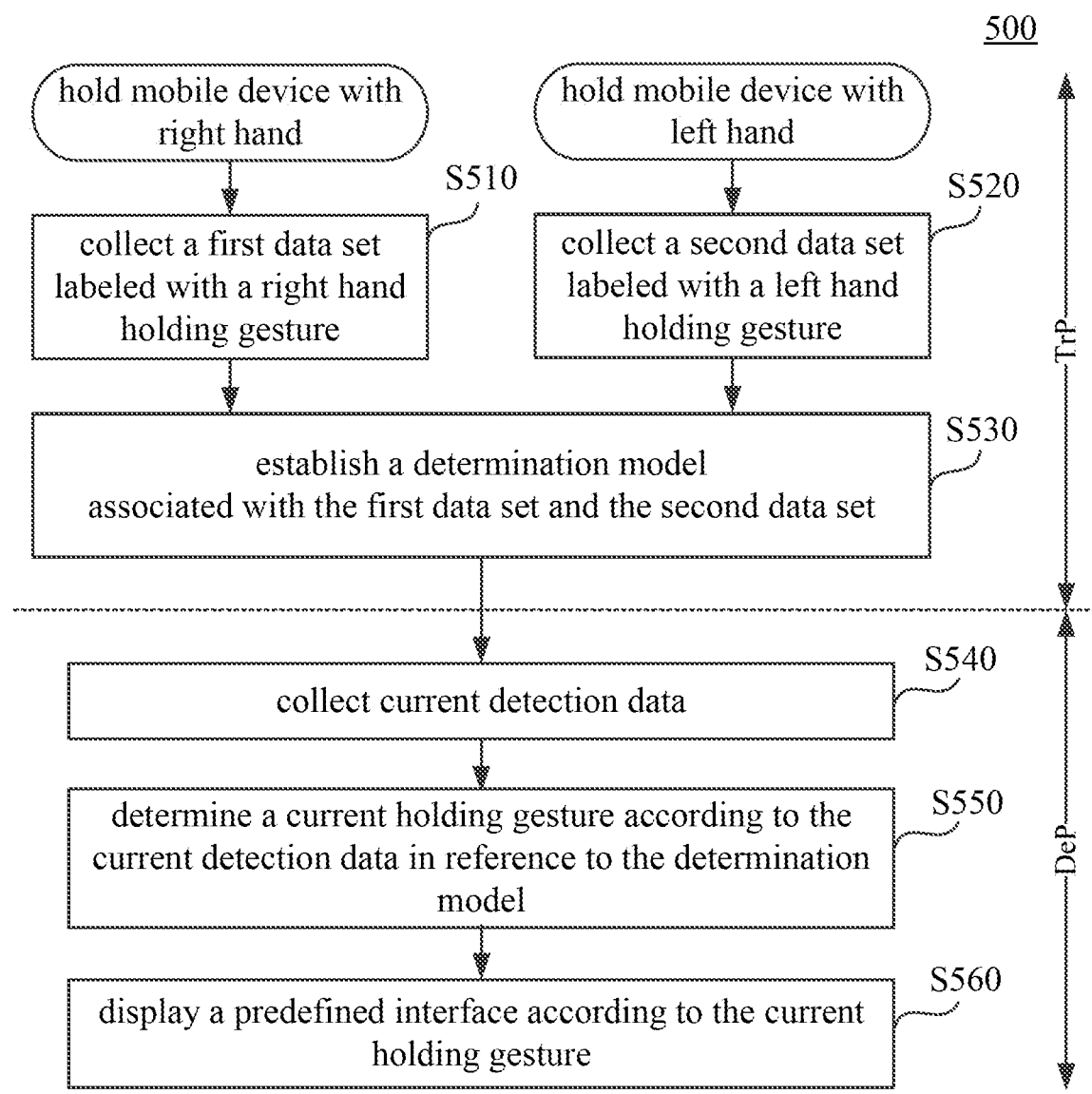
FIG. 5 is a flowchart of the control method of the mobile device in FIG. 1 in accordance with one embodiment of the present disclosure.

Referring to FIG. 1 and FIG. 5. Details of the present disclosure are described in the paragraphs below with reference to a control method 500 in FIG. 5, in which FIG. 5 is a flowchart of the control method 500 of the mobile device 100 in FIG. 1, in accordance with one embodiment of the present disclosure.

It should be noted that, in some embodiments, the control method 500 may be implemented as a computer program. In some embodiments, the computer program can be executed by the processor 110 of the mobile device 100.

As shown in FIG. 5, the control method 500 includes at least a training phase TrP and a detection phase DeP. In the training phase TrP, the control method 500 is performed to establish a determination model, which can be utilized in the following detection phase DeP to recognize a current holding gesture about how the user hold the mobile device 100. The determination model is stored in the memory 130.

In some embodiments, the training phase TrP can be performed when the user purchases his/her own mobile device 100. As shown in FIG. 1 and FIG. 5, in the training phase TrP, the mobile device 100 may show some instructions on the display 140 to encourage the user to hold a specific hand. For example, the user is guided to hold the mobile device 100 in his/her right hand, and operation S510 is performed to collect a first data set labeled with a right hand holding gesture when the instructions show "RIGHT HAND", and also operation S520 is performed to collect a second data set labeled with a left hand holding gesture when the instructions show "LEFT HAND".

In some other embodiments, the training phase TrP can be performed in a lab or a research center by designers or manufacturers of the mobile device 100, before the mobile device 100 is shipping to the user. In this case, the first data set and the second data set can be collected when the designers or manufacturers holding the mobile device 100 with desired hands.

Figure 6:
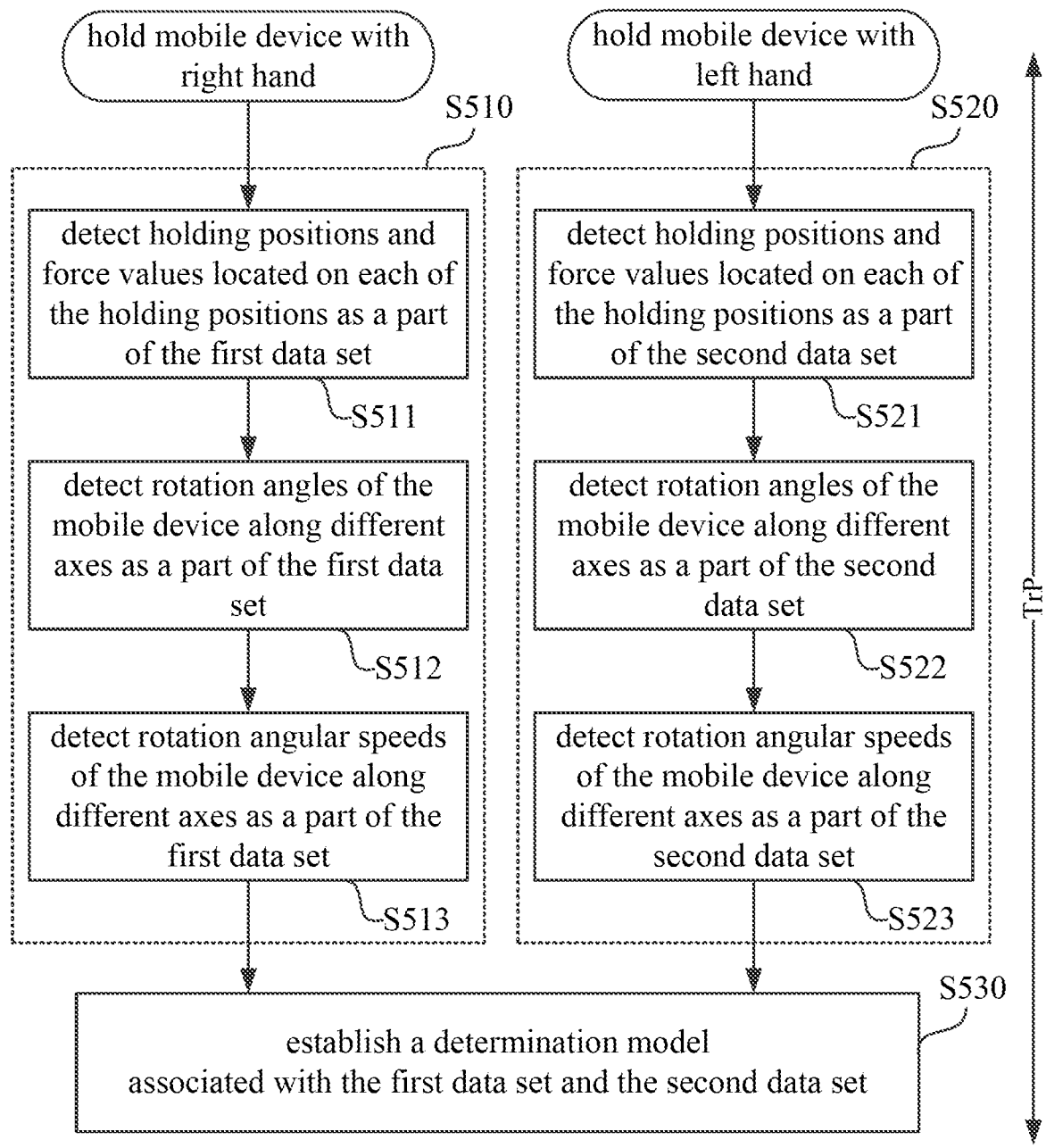
FIG. 6 is a flow diagram illustrating further detail in the training phase of the control method in FIG. 5 according to some embodiments of the disclosure.

After the first data set and the second data set are collected, operation S530 is performed to establish a determination model associated with the first data set and the second data set. Reference is further made to FIG. 6, which is a flow diagram illustrating further detail in the training phase TrP of the control method 500 in FIG. 5 according to some embodiments of the disclosure.

As shown in FIG. 6, when the mobile device is held by the right hand 350 in FIG. 3B, operation S510 may include at least one of operations 511-513. Operation 511 is performed by the pressure sensors (e.g., as the pressure sensors 121 and 122 shown in FIG. 2A or FIG. 2B) to detect the holding positions and the force values located on each of the holding positions, and the processor 110 is configured to collect these holding positions and the force values as a part of the first data set. When the user holds the mobile device 100 in different ways, a distribution of the holding positions and the force values will be different accordingly. Operation 512 is performed by the rotation detector (e.g., as the rotation detector 123 shown in FIG. 1) to detect the rotation angles of the mobile device 100 along different axes (e.g., directional vectors of X axis, Y axis and Z axis as shown in FIG. 4A and FIG. 4B), and the processor 110 is configured to collect these rotation angles as a part of the first data set. When the user holds the mobile device 100 in different ways, directional vectors of X axis, Y axis and Z axis will be different accordingly. Operation 513 is performed by the angular speed detector (e.g., as the angular speed detector 124 shown in FIG. 1) to detect the rotation angular speeds of the mobile device 100 along different axes (e.g., directional vectors of X axis, Y axis and Z axis as shown in FIG. 4A and FIG. 4B) and the processor 110 is configured to collect these rotation angular speeds as a part of the first data set. When the user holds the mobile device 100 in different ways, the rotation angular speeds along directional vectors of X axis, Y axis and Z axis will be different accordingly. It is noticed that operations S511, S512 and S513 are not limited to perform in an order shown in FIG. 6. In some embodiments, the order of the operations S511, S512 and S513 can be interchanged. In some embodiments, the operations S511, S512 and S513 can be performed at the same time or in a short period of time (e.g., every 1 microsecond to every 1 microsecond). In some embodiments, the control method 500 is not limited to all of three operations S511, S512 and S513, and the control method 500 may collect at least one kind of information (e.g., the holding positions and the force values, the rotation angles, or the rotation angular speeds) as the first data set when the mobile device 100 is held in the right hand.

As shown in FIG. 6, when the mobile device is held by the left hand 340 in FIG. 3A, operation S520 may include at least one of operations 521-523. Operation 521 is performed by the pressure sensors (e.g., as the pressure sensors 121 and 122 shown in FIG. 2A or FIG. 2B) to detect the holding positions and the force values located on each of the holding positions, and the processor 110 is configured to collect these holding positions and the force values as a part of the second data set. Operation 522 is performed by the rotation detector (e.g., as the rotation detector 123 shown in FIG. 1) to detect the rotation angles of the mobile device 100 along different axes (e.g., directional vectors of X axis, Y axis and Z axis as shown in FIG. 4A and FIG. 4B), and the processor 110 is configured to collect these rotation angles as a part of the second data set. Operation 523 is performed by the angular speed detector (e.g., as the angular speed detector 124 shown in FIG. 1) to detect the rotation angular speeds of the mobile device 100 along different axes (e.g., directional vectors of X axis, Y axis and Z axis as shown in FIG. 4A and FIG. 4B) and the processor 110 is configured to collect these rotation angular speeds as a part of the second data set. Details of operations S521, S522 or S523 are similar to aforesaid operations S511, S512 or S513, and not repeated here. It is noticed that operations S521, S522 and S523 are not limited to perform in an order shown in FIG. 6. In some embodiments, the order of the operations S521, S522 and S523 can be interchanged. In some embodiments, the operations S521, S522 and S523 can be performed at the same time or in a short period of time (e.g., every 1 microsecond to every 1 microsecond). In some embodiments, the control method 500 is not limited to all of three operations S521, S522 and S523, and the control method 500 may collect at least one kind of information (e.g., the holding positions and the force values, the rotation angles, or the rotation angular speeds) as the second data set when the mobile device 100 is held in the left hand.

In the embodiments, the operation S530 is performed to establish the determination model associated with the first data set (including the holding positions and corresponding the force values, the rotation angles and/or the rotation angular speeds collected in operations S511-S513) and the second data set (including the holding positions and corresponding the force values, the rotation angles and/or the rotation angular speeds collected in operations S521-S523). Once the training phase TrP is completed, the control method 500 can utilize the determination model to determine a current holding gesture about whether the mobile device 100 is held in the right hand or the left hand. The training phase TrP is not required to perform every time the mobile device 100 wants to determine the current holding gesture. In some embodiments, the training phase TrP can be performed by once, every determination, every 10 determination, every hour, every day, every week, in response to user's request or any equivalent gap.

Referring to FIG. 1 and FIG. 5, when the training phase TrP is finished, the determination model is established. The control method 500 is able to perform the detection phase DeP. In the detection phase DeP, the control method 500 performs operation S540, by the processor 110, to collect a current detection data, which is a current data about how the user holds the mobile device 100 currently. Then, operation S550 is performed, by the processor 110, to determine a current holding gesture according to the current detection data in reference to the determination model, which is established in the training phase TrP. Afterward, the mobile device 100 may launch a certain function (e.g., displaying a predefined interface, a phone-calling function, a selfie shooting function or likes) according to the current hand holding gesture. In some embodiments shown in FIG. 5, the control method 500 performs S560 to display a predefined interface according to the current holding gesture.

Figure 7:
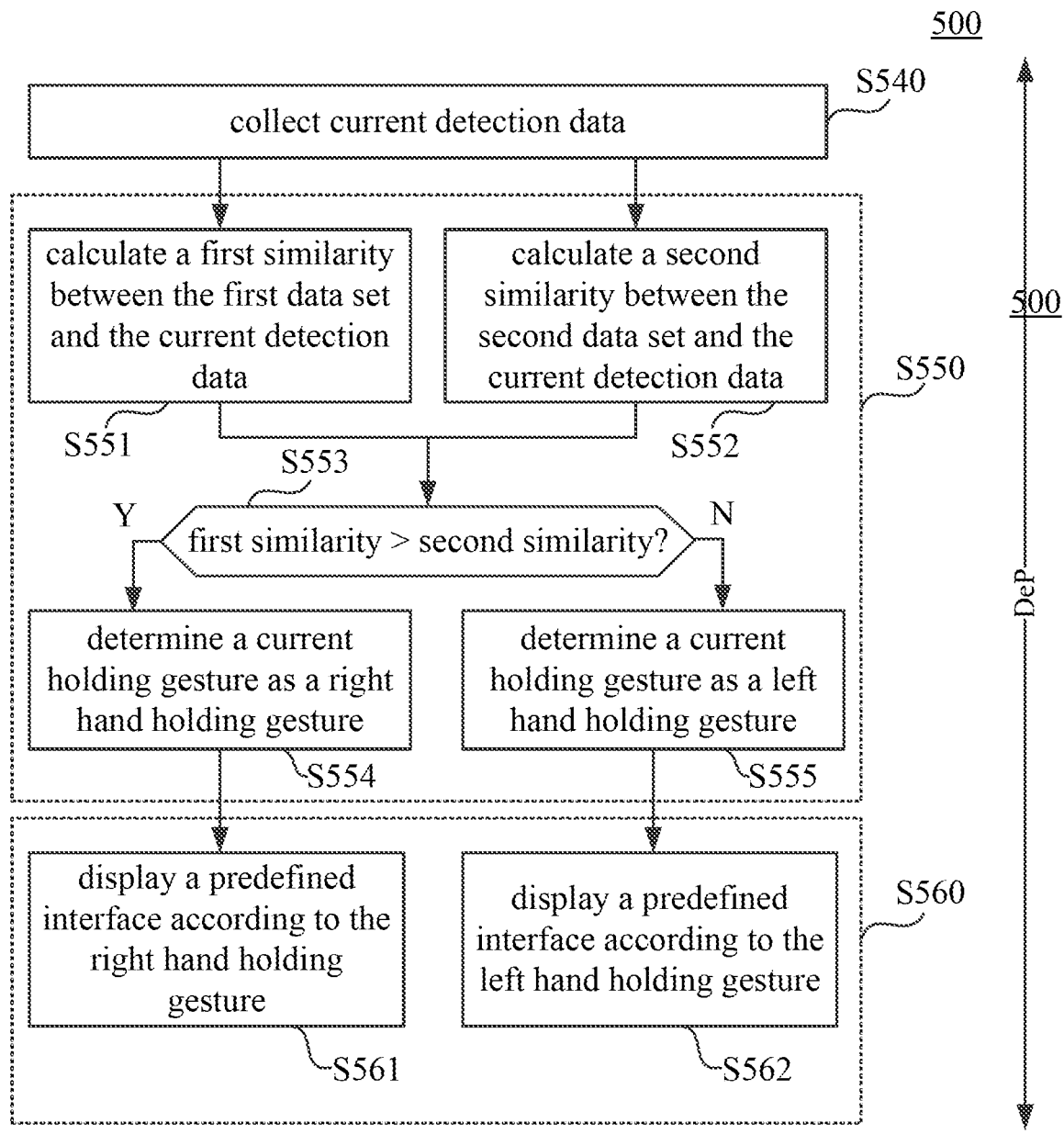
FIG. 7 is a flow diagram illustrating further details of the detection phase in the control method according to some embodiments of the disclosure.

Reference is further made to FIG. 7, which is a flow diagram illustrating further details of the detection phase DeP in the control method 500 according to some embodiments of the disclosure. In operation S540, the current detection data may contain at least one kinds of information including the holding positions and the force values, the rotation angles or the rotation angular speeds, or a combination thereof. Details about how to obtain the current detection data can be referred to operations S511-S513 or S521-S523, and not repeated here again.

As shown in FIG. 7, operation S550 may include further operations S551-S555. Operation S551 is performed, by the processor 110, to calculate a first similarity between the first data set (from the determination model) and the current detection data. In this case, the first data set in the determination model represents a prototype of the right hand holding gesture. The first similarity represents how similar between the current detection data to the right hand holding gesture. In an embodiment, the first data set can be represented by a regression plane in a high-dimensional space, and dimensions of the high-dimensional space are defined by the holding positions, the force values, the rotation angles and the rotation angular speeds collected in the operation S510. The current detection data can be converted into a projection point in the high-dimensional space. In this embodiment, the first similarity between the first data set and the current detection data is negatively correlated with a gap distance between the projection point and the regression plane corresponding to the first data set. If the projection point is farer from the regression plane (the gap distance is larger), the first similarity is smaller. If the projection point is closer from the regression plane (the gap distance is smaller), the first similarity is higher.

Operation S552 is performed, by the processor 110, to calculate a second similarity between the second data set (from the determination model) and the current detection data. In this case, the second data set in the determination model represents a prototype of the left hand holding gesture. The second similarity represents how similar between the current detection data to the left hand holding gesture. In an embodiment, the second data set can be represented by another regression plane in the high-dimensional space. In this embodiment, the second similarity between the second data set and the current detection data is negatively correlated with a gap distance between the projection point (corresponding to the current detection data) and the another regression plane (corresponding to the second data set). If the projection point is farer from the another regression plane (the gap distance is larger), the second similarity is smaller. If the projection point is closer from the another regression plane (the gap distance is smaller), the second similarity is higher.

Operation S553 is performed, by the processor 110, to compare the first similarity and the second similarity. When the first similarity exceeds the second similarity, operation S554 is performed, by the processor, to determine the current holding gesture as the right hand holding gesture. On the other hand, when the second similarity exceeds the first similarity, operation S555 is performed, by the processor, to determine the current holding gesture as the left hand holding gesture.

As shown in FIG. 7, operation S560 includes further operations S561 and S562. When the current holding gesture is determined as the right hand holding gesture, operation S561 is performed to display a predefined interface according to the right hand holding gesture. As shown in FIG. 3B, the predefined interface 310 is displayed at the right side of the display 140 adjacent to the thumb of the right hand 350 when the current holding gesture is determined to the right hand holding gesture.

When the current holding gesture is determined as the left hand holding gesture, operation S562 is performed to display a predefined interface according to the right hand holding gesture. As shown in FIG. 3A, the predefined interface 310 is displayed at the left side of the display 140 adjacent to the thumb of the left hand 340 when the current holding gesture is determined to the left hand holding gesture.

In aforesaid embodiments, the first data set, the second data set and/or the current detection data are detected, collected and compared to determine the current holding position. However, the disclosure is not limited thereto. In some embodiments, the first data set, the second data set and/or the current detection data can be converted into another format to be stored or compared between each other.

Figure 8:
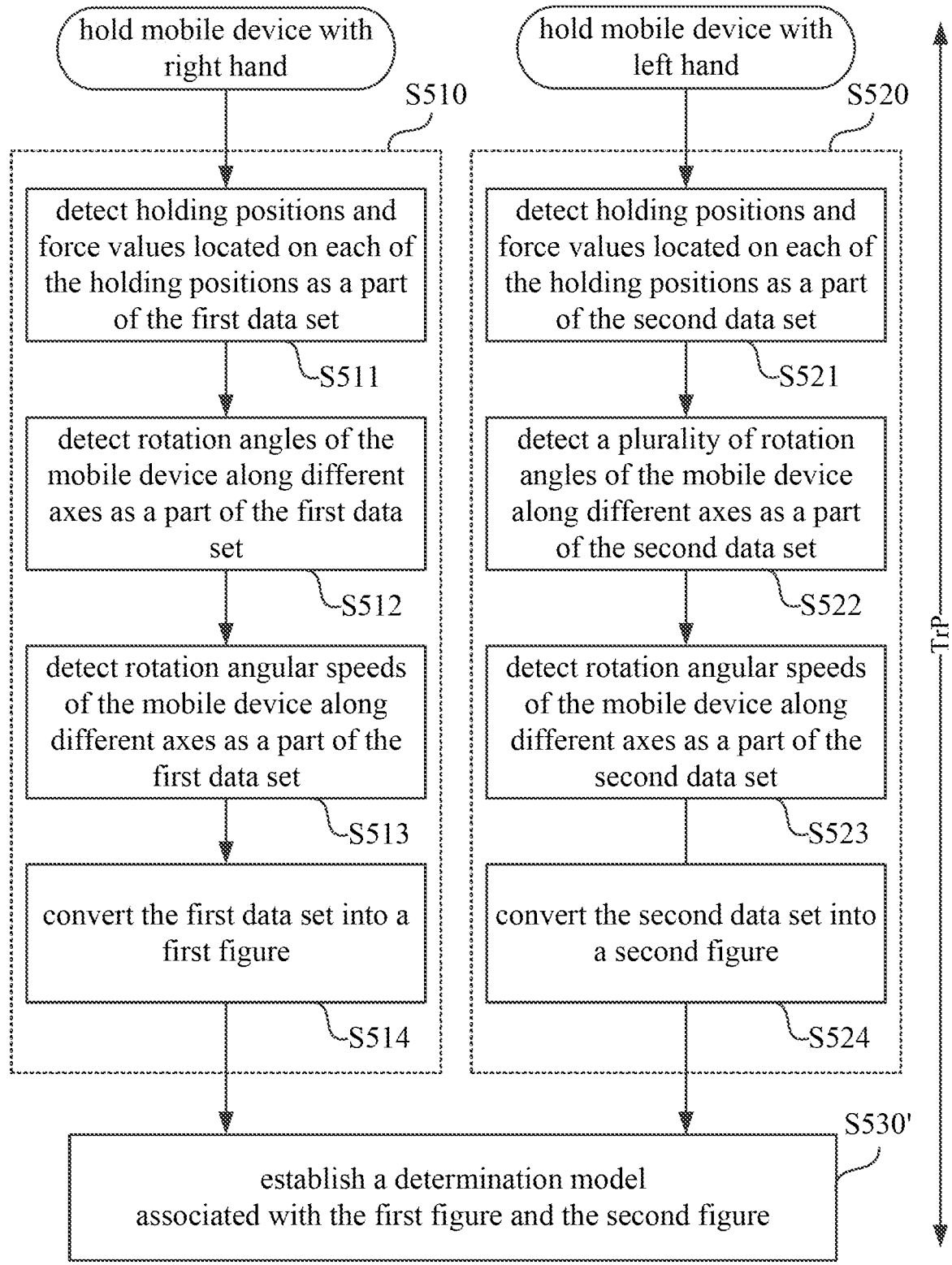
FIG. 8 is a flow diagram illustrating the training phase of the control method according to some embodiments.
Figure 9:
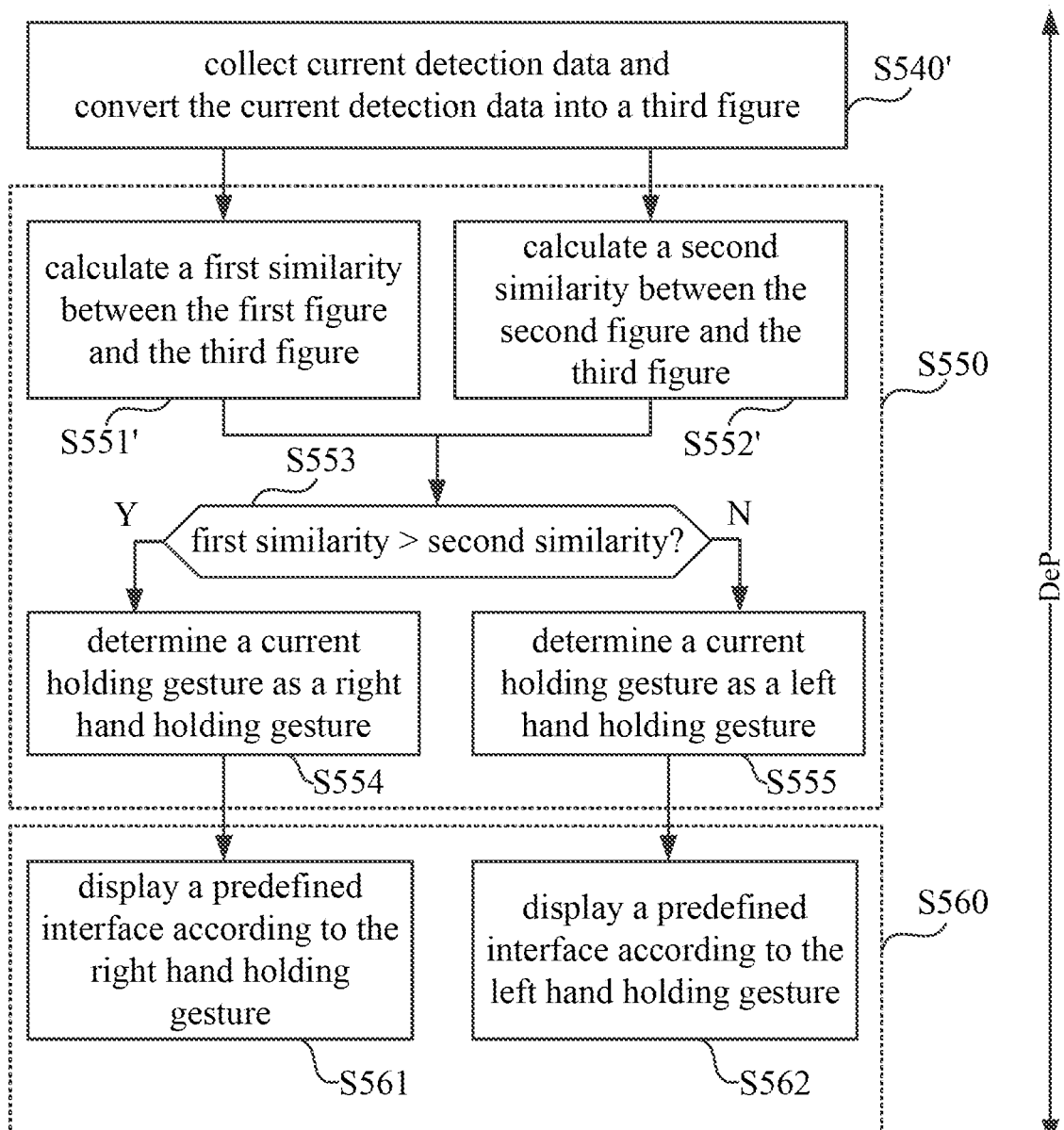
FIG. 9 is a flow diagram illustrating the detection phase of the control method according to some embodiments.

Reference is further made to FIG. 8 and FIG. 9. FIG. 8 is a flow diagram illustrating the training phase TrP of the control method 500 according to some embodiments, and FIG. 9 is a flow diagram illustrating the detection phase DeP of the control method 500 according to some embodiments.

Compared to embodiments in FIG. 6, operation S510 in FIG. 8 further include operation S514, which is performed, by the processor 110, to convert the first data set into a first figure.

Figure 10:
FIG. 10 is an exemplary diagram illustrating a first figure converted from the first data set according to some embodiments.

In operations S511-S513, the processor 110 collects a lot of information as the first data set. In one embodiment, the sensing module 120 senses a great amount of sample force values in different time slots when the mobile device 100 is held with the right hand holding gesture. In one embodiment, the sensing module 120 may also sense a great amount of rotation angles and rotation angular speeds in different time slots when the mobile device 100 is held with the right hand holding gesture. For illustration, take the mobile device 100 in FIG. 2B as an example, the first data set can be converted into a first figure F01 shown in FIG. 10. FIG. 10 is an exemplary diagram illustrating the first figure F01 converted from the first data set according to some embodiments. The first figure F01 includes a plurality of pixels. Grey levels of the pixels in the first figure F01 are determined by the first data set. In detail, for example, in time slot T0, the data D11, D12, D13, D14, D15, D16, D17, D18 are the force values obtained by the sensing pad 211, 212, 213, 214, 221, 222, 223, 224 respectively, the data R11 is the rotation angle along the X axis, the data R12 is the rotation angle along the Y axis, the data R13 is the rotation angle along Z axis, the data A11 is the rotation angular speed along the X axis, the data A12 is the rotation angular speed along the Y axis and the data A13 is the rotation angular speed along the Z axis. Values of the data D11-D18, R11-R13 and A11-A13 will decide the grey levels of corresponding pixels in the first figure F01. For example, when the values are larger, the pixels can be darker. When the values are smaller, the pixels can be brighter.

In time slot T1, the data D21-D28 are the force values obtained by the sensing pads 211-214 and 221-224 respectively, the data R21 is the rotation angle along the X axis, the data R22 is the rotation angle along the Y axis, the data R23 is the rotation angle along the Z axis, the data A21 is the rotation angular speed along the X axis, the data A22 is the rotation angular speed along the Y axis and the data A23 is the rotation angular speed along the Z axis.

Similarly, the data D31-D38, R31-R33, A31-A33 corresponds to time slot T2. The data D41-D48, R41-R43, A41-A43 corresponds to time slot T3. The data D51-D58, R51-R53, A51-A53 corresponds to time slot T4. In this case, the first figure F01 can represent the first data set include data detected by the sensing module 120 in five time slots T0-T4.

As shown in FIG. 8, operation S520 in FIG. 8 further include operation S524 compared to FIG. 6. Operation S524 is performed to convert the second data set into a second figure. A structure of the second figure can be similar to the first figure F01 shown in FIG. 10, and not repeated here.

Afterward, operation S530' is performed by the method 500 to establish the determination model associated with the first figure and the second figure. In some embodiment, the determination model may record the first figure and the second figure, which can represent the first data set and the second data set.

As shown in FIG. 9, operation S540' in FIG. 9 is performed to collect the current detection data and convert the current detection data into a third figure (not shown). A structure of the third figure can be similar to the first figure F01 shown in FIG. 10, and not repeated here. As shown in FIG. 9, operation S551' in FIG. 9 is performed, by the processor 110, to calculate a first similarity between the first figure and the third figure. In this embodiment, the first similarity between the first data set and the current detection data can be calculated by comparing the first figure F01 and the third figure according to an image comparison algorithm, such as a histogram matching algorithm, a perceptual hash algorithm or any equivalent algorithm for comparing images. As shown in FIG. 9, operation S552' in FIG. 9 is performed, by the processor 110, to calculate a second similarity between the second figure and the third figure. In this embodiment, the second similarity between the second data set and the current detection data can be calculated by comparing the second figure and the third figure according to an image comparison algorithm, such as a histogram matching algorithm, a perceptual hash algorithm or any equivalent algorithm for comparing images. After the first similarity and the second similarity are calculated, the control method 500 can perform the following operations S553-S562, which are similar to embodiments shown in FIG. 7, and not repeated here.

Figure 11:
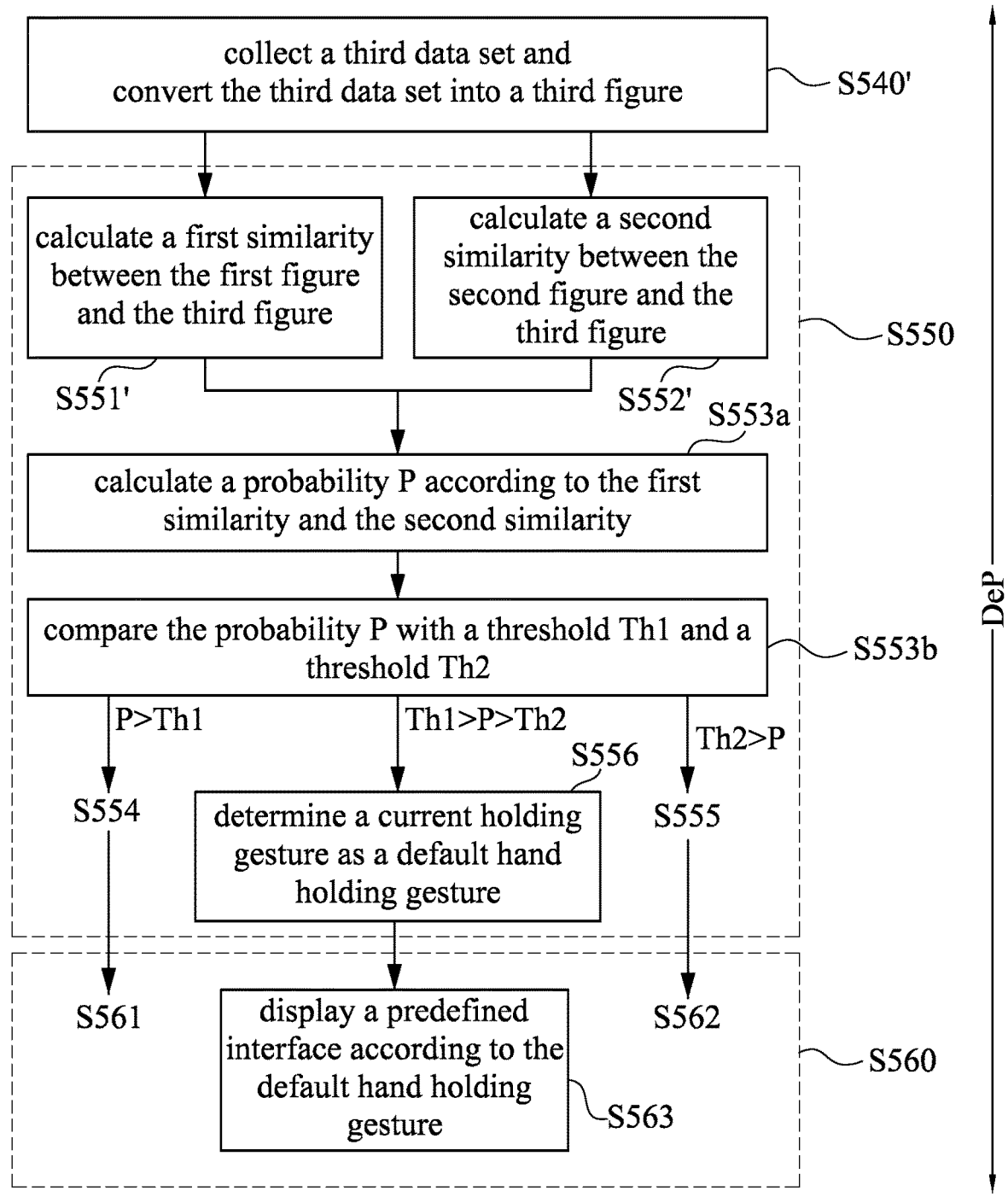
FIG. 11 is a flow diagram illustrating the detection phase of the control method according to some other embodiments of the disclosure.

Reference is further made to FIG. 11, which is a flow diagram illustrating the detection phase DeP of the control method 500 according to some other embodiments of the disclosure. As shown in FIG. 11, the operation S550 in embodiments shown in FIG. 11 further include operation S553a, S553b and S556 compared to embodiments in FIG. 9.

Operation S553a is performed to calculate a probability P according to the first similarity and the second similarity. In an embodiment, the determination model will generate a determination value according to the first similarity (between the current detection data and the first data set) and the second similarity (between the current detection data and the second data set). The determination value is in a range from negative infinity to positive infinity. The determination value can be converted by a generalized logistic function (e.g., a sigmoid function) into a probability P in a range between 0 and 1. When the first similarity is higher than the second similarity, the probability P will be closer to 1. When the first similarity is lower than the second similarity, the probability P will be closer to 0. When the first similarity is adjacent to the second similarity, the probability P will be closer to 0.5.

Operation S553b is performed to compare the probability P with two thresholds Th1 and Th2. In some embodiments, the threshold Th1 can be set as 0.7, and the threshold Th2 can be set as 0.3. In some embodiments, the threshold Th1 can be set as 0.6, and the threshold Th2 can be set as 0.4.

When the probability P exceeds the threshold Th1, operations S554 and S561 are performed, referring to FIG. 7 and FIG. 9. When the probability P is lower the threshold Th2, operations S555 and S562 are performed, referring to FIG. 7 and FIG. 9.

When the probability P is between the threshold Th1 and the threshold Th2, it means that it is hard to recognize the current holding gesture. In this case, the control method 500 performs operation S556 to determine the current holding gesture as a default hand holding gesture. In some embodiments, the default hand holding gesture can be set as the right hand, the left hand, the hand detected in the latest detection phase DeP, or the hand detected with most counts in the latest 10 times of the detection phase DeP. Afterward, in some embodiments, operation S563 is performed to display the predefined interface according to the default hand holding gesture.

Figure 12:
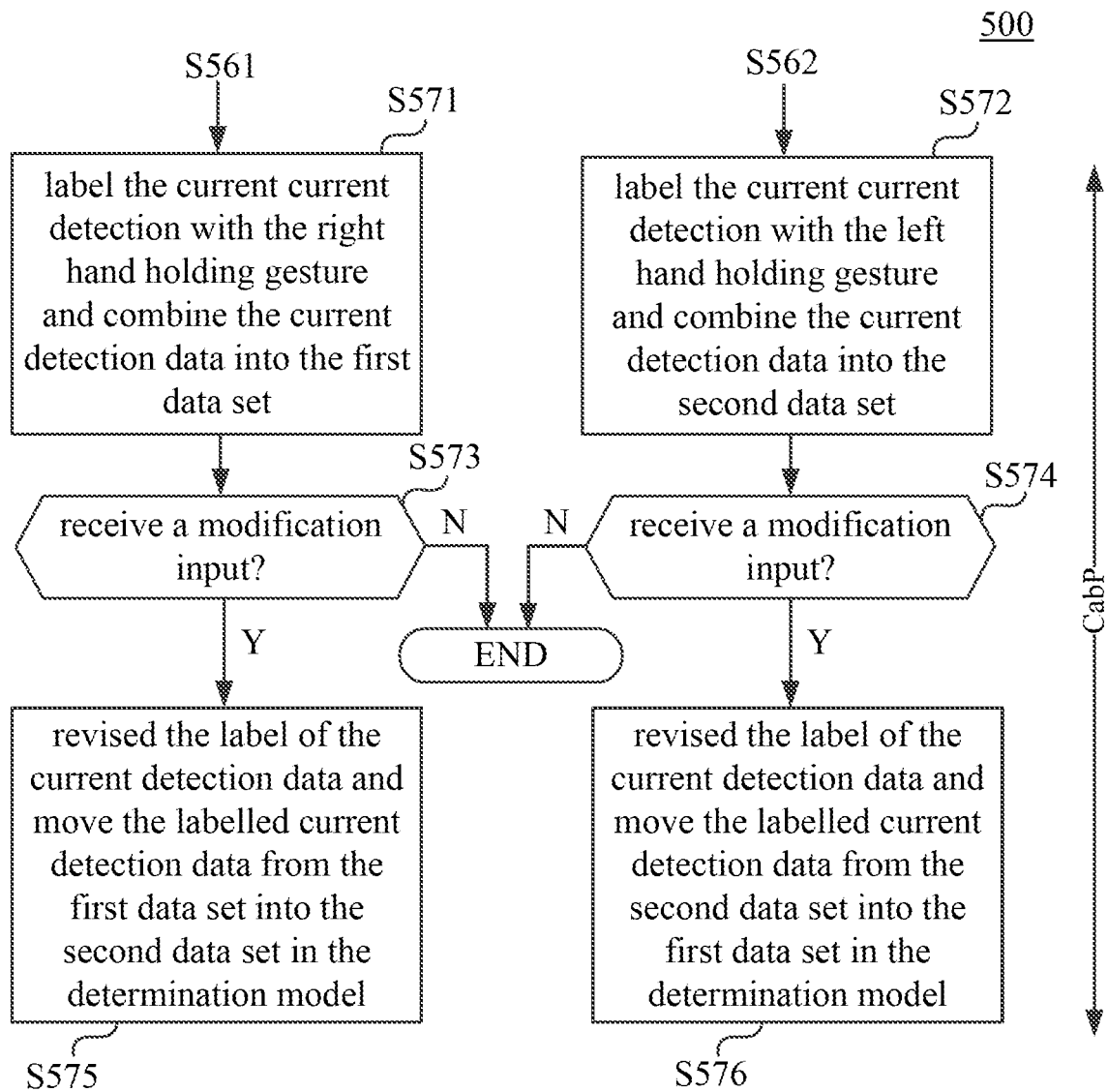
FIG. 12 is a flow diagram illustrating a calibration phase of the control method after the detection phase according to some embodiments.

Reference is further made to FIG. 12, which is a flow diagram illustrating a calibration phase CabP of the control method 500 after the detection phase DeP according to some embodiments.

After the detection phase DeP in FIG. 5, FIG. 7, FIG. 9 or FIG. 11, the current hand holding gesture is determined and the corresponding function is triggered accordingly. The control method 500 can further include the calibration phase CabP after the detection phase DeP to elevate a preciseness of the detection.

As shown in FIG. 12, the calibration phase CabP includes operations S571-S576.

It is assumed that the current holding gesture is determined as the left hand holding gesture according to the current detection data during the detection phase DeP. In operation S562, the display 140 displays the predefined interface 310 on the left side because the current holding gesture is determined as the left hand holding gesture.

In this case, operation S572 is performed to label the current detection data with left hand holding gesture, and update the determination model by adding the labelled current detection data into the second data set in the determination model. The operation S572 is performed to combine the current detection data (determined to be labelled with left hand holding gesture in the detection phase DeP) into the second data set in the determination model, so as to dynamically update the determination model.

Figure 13A:
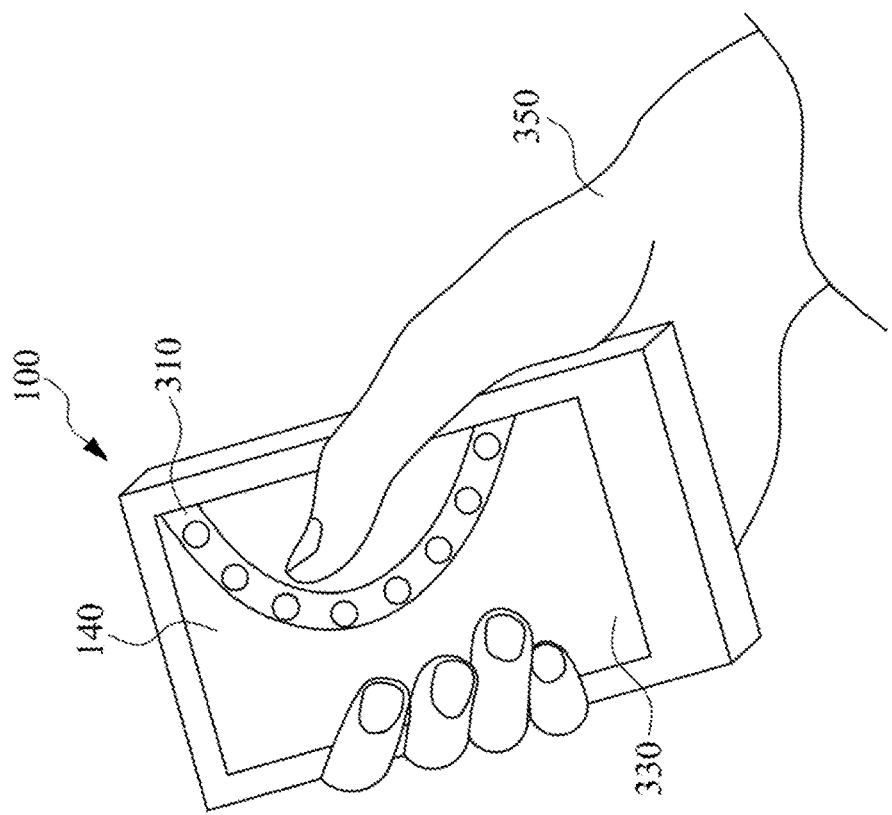
FIG. 13A and FIG. 13B are schematic diagrams illustrating a modification input is received by the mobile device in some embodiment.

In some case, a determination result generated in the detection phase DeP can be wrong, and the predefined interface 310 might be displayed on the wrong side. Reference to further made to FIG. 13A, which is a schematic diagram illustrating a modification input is received by the mobile device 100 in some embodiment. As shown in FIG. 13A, the predefined interface 310 is shown on the left side of the display 140. However, the predefined interface 310 is located away from a user's thumb. Because, the user is current holding the mobile device 100 with his/her right hand. In other words, the determination result "the left hand holding gesture" generated in the detection phase DeP is mistaken.

Figure 13B:
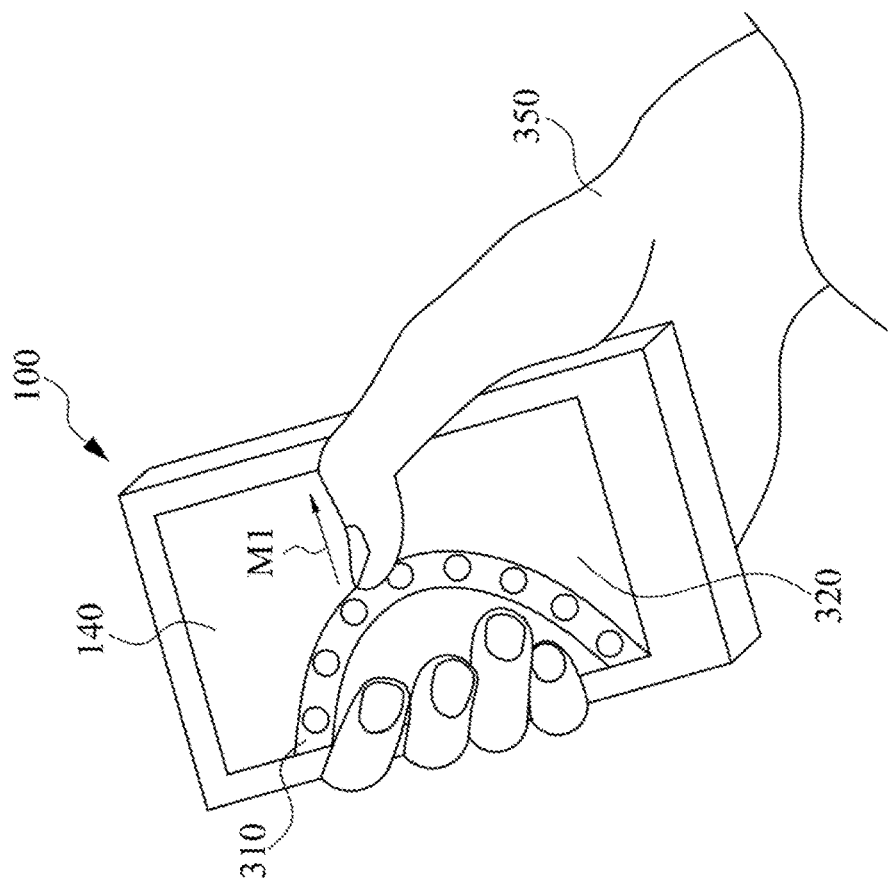

In a demonstrational example, the mobile device 100 further include a touch sensor integrated with the display 140 as a touch-sensitive display, such that the mobile device 100 can sense a touch input on the touch-sensitive display 140. As shown in FIG. 13A, the predefined interface 310 is shown on the left side of the display 140 of the mobile device 100 away from a user's thumb. After figuring out the predefined interface 310 is shown away from the user's thumb, the user can perform a slide motion M1 on the touch-sensitive display 140, the modification input corresponding to the slide motion M1 can be received by the touch-sensitive display. The touch-sensitive display is able to send the modification input to the processor 110. Reference to further made to FIG. 13B, which is a schematic diagram illustrating that the predefined interface 310 is relocated after the modification input is received. After receiving the modification input, the predefined interface 310 will be moved to the right side, as shown in FIG. 13B, of the touch-sensitive display 140 as the user requests. In the meantime, operation S576 will be performed to revise the label of the current detection data (into labelled with the right hand holding gesture), and move the labelled current detection data from the second data set into the first data set in the determination model.

If the modification input is not received (i.e., it means that the determination result generated in the detection phase DeP is correct), the control method 500 ends the calibration phase CabP, and the labelled current detection data will be stored in the second data set of the determination model.

On the other hand, in operation S561, the display 140 displays the predefined interface on the right side because the current holding gesture is determined as the right hand holding gesture, operation S571 is performed to label current detection data with the right hand holding gesture, and combine the labelled current detection data into the first data set in the determination model, so as to dynamically update the determination model. Operation S573 is performed to determine whether a modification input is received. If the modification input is received (e.g., a slide motion performed by the user on the touch-sensitive display to correct the position of the predefined interface 310), operation S575 is performed to revise the label of the current detection data (into labelled with the left hand holding gesture), and move the labelled current detection data from the first data set into the second data set in the determination model. If the modification input is not received, the control method 500 ends the calibration phase CabP.

In summary, through the operations of embodiments described above, the predefined interface 310 can be dynamically shown near user's thumb on the display 140 of the mobile device 100 for convenience use.

Another embodiment of disclosure includes a non-transitory computer readable storage medium (e.g., the memory 130 shown in FIG. 1, a hard drive, or any equivalent storage unit) with a computer program to execute aforesaid control method 500 shown in FIG. 5, FIG. 6, FIG. 7, FIG. 8, FIG. 9, FIG. 11 and FIG. 12 respectively.

Although the present disclosure has been described in considerable details with reference to certain embodiments thereof, other embodiments are possible. Therefore, the scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A mobile device comprising:
   a plurality of sensors disposed on opposite edges of the mobile device respectively, each of the sensors configured to detect a plurality of holding positions and a plurality of force values located on each of the holding positions;
   a memory configured to store a determination model generated from a first data set labeled with a right hand holding gesture and a second data set labeled with a left hand holding gesture, the first data set comprising the holding positions and the force values detected by the sensors corresponding to the mobile device being held in a right hand, the second data set comprising the holding positions and the force values detected by the sensors corresponding to the mobile device being held in a left hand, wherein the first data set comprises information corresponding to a plurality of first pixels in a first figure, the second data set comprises information corresponding to a plurality of second pixels in a second figure, grey levels of the first pixels are determined at least by the holding positions and the force values detected by the sensors corresponding to the mobile device being held in the right hand, grey levels of the second pixels are determined at least by the holding positions and the force values detected by the sensors corresponding to the mobile device being held in the left hand, the determination model is established associated with the first figure and the second figure; and
   a processor coupled to the sensors, the processor being configured to:
      collect a current detection data comprising the holding positions and the force values by the sensors; and
      determine a current holding gesture and correspondingly perform a predefined function according to the current detection data in reference to the determination model.

2. The mobile device as claimed in claim 1, wherein the processor is further configured to:
   calculate a first similarity between the first data set and the current detection data, and a second similarity between the second data set and the current detection data; and
   recognize the current holding gesture according to the first similarity and the second similarity.

3. The mobile device as claimed in claim 2, wherein the processor is further configured to:
   calculate a probability of the current holding gesture according to the first similarity and the second similarity; and
   compare the probability of the current holding gesture with at least one threshold to determine whether the current holding gesture is the right hand holding gesture or the left hand holding gesture.

4. The mobile device as claimed in claim 3, wherein the processor is further configured to:
   determine the current holding gesture is the right hand holding gesture in response to the probability being higher than a first threshold of the at least one threshold; and
   determine the current holding gesture is the left hand holding gesture in response to the probability being lower than a second threshold of the at least one threshold.

5. The mobile device as claimed in claim 4, wherein the processor is further configured to:
   determine the current holding gesture is a default hand holding gesture in response to the probability being between the first threshold and the second threshold, wherein the default hand holding gesture is the right hand holding gesture or the left hand holding gesture.

6. The mobile device as claimed in claim 1, further comprising:
   a rotation detector coupled to the processor and configured to detect a plurality of rotation angles of the mobile device along different axes,
   wherein the first data set further comprises the rotation angles detected by the rotation detector corresponding to the mobile device being held in the right hand, the second data set further comprises the rotation angles detected by the rotation detector corresponding to the mobile device being held in the left hand;
   wherein the processor is further configured to:
      collect the rotation angles corresponding to the current holding gesture from the rotation detector into the current detection data, and determine the current holding gesture according to the current detection data comprising the holding positions, the force values and the rotation angles.

7. The mobile device as claimed in claim 1, further comprising:

an angular speed detector coupled to the processor and configured to detect a plurality of rotation angular speeds of the mobile device along different axes, wherein the first data set further comprises the rotation angular speeds detected by the angular speed detector corresponding to the mobile device being held in the right hand, the second data set further comprises the rotation angular speeds detected by the angular speed detector corresponding to that the mobile device being held in the left hand;

wherein the processor is further configured to:
collect the rotation angular speeds corresponding to the current holding gesture from the angular speed detector into the current detection data, and determine the current holding gesture according to the current detection data comprising the holding positions, the force values and the rotation angular speeds.

8. The mobile device as claimed in claim 1, wherein the processor is further configured to:
label the current detection data with the right hand holding gesture or the left hand holding gesture according to the determined current holding gesture; and
update the determination model by combining the labelled current detection data into one of the first data set or the second data set in the determination model.

9. The mobile device as claimed in claim 8, wherein the processor is further configured to:
determine whether a modification input is received; and
in response to the modification being received, revise the labelled current detection data and update the determination model.

10. A control method, suitable for a mobile device comprising a plurality of sensors disposed on at least two edges of the mobile device, the sensors being disposed on different positions on the edges, the control method comprising:
sensing a plurality of holding positions and a plurality of force values located on each of the holding positions by the sensors;
collecting a current detection data comprising the holding positions and the force values by the sensors; and
determining a current holding gesture and correspondingly performing a predefined function according to the current detection data in reference to a determination model,
wherein the determination model is generated from a first data set labeled with a right hand holding gesture and a second data set labeled with a left hand holding gesture, the first data set comprising the holding positions and the force values detected by the sensors corresponding to the mobile device being held in a right hand, the second data set comprising the holding positions and the force values detected by the sensors corresponding to the mobile device being held in a left hand, the first data set comprises information corresponding to a plurality of first pixels in a first figure, the second data set comprises information corresponding to a plurality of second pixels in a second figure, grey levels of the first pixels are determined at least by the holding positions and the force values detected by the sensors corresponding to the mobile device being held in the right hand, grey levels of the second pixels are determined at least by the holding positions and the force values detected by the sensors corresponding to the mobile device being held in the left hand, the determination model is established associated with the first figure and the second figure.

11. The control method as claimed in claim 10, wherein the step of determining the current holding gesture comprises:
calculating a first similarity between the first data set and the current detection data, and a second similarity between the second data set and the current detection data; and
recognizing the current holding gesture according to the first similarity and the second similarity.

12. The control method as claimed in claim 11, wherein the step of determining the current holding gesture further comprises:
calculating a probability of the current holding gesture according to the first similarity and the second similarity; and
comparing the probability of the current holding gesture with at least one threshold to determine whether the current holding gesture is the right hand holding gesture or the left hand holding gesture.

13. The control method as claimed in claim 12, wherein the current holding gesture is determined as the right hand holding gesture in response to the probability being higher than a first threshold of the at least one threshold, and the current holding gesture is determined as the left hand holding gesture in response to the probability being lower than a second threshold of the at least one threshold.

14. The control method as claimed in claim 13, wherein the current holding gesture is determined as a default hand holding gesture in response to the probability being between the first threshold and the second threshold, and the default hand holding gesture is the right hand holding gesture or the left hand holding gesture.

15. The control method as claimed in claim 10, further comprising:
detecting a plurality of rotation angles of the mobile device along different axes;
collecting the rotation angles corresponding to the current holding gesture into the current detection data; and
determining the current holding gesture according to the current detection data comprising the holding positions, the force values and the rotation angles,
wherein the first data set further comprises the rotation angles corresponding to the mobile device being held in the right hand, the second data set further comprises the rotation angles corresponding to the mobile device being held in the left hand.

16. The control method as claimed in claim 10, further comprising:
detecting a plurality of rotation angular speeds of the mobile device along different axes;
collecting the rotation angular speeds corresponding to the current holding gesture into the current detection data; and
determining the current holding gesture according to the current detection data comprising the holding positions, the force values and the rotation angular speeds,
wherein the first data set further comprises the rotation angular speeds corresponding to the mobile device being held in the right hand, the second data set further comprises the rotation angular speeds corresponding to that the mobile device being held in the left hand.

17. The control method as claimed in claim 10, further comprising:
labeling the current detection data with the right hand holding gesture or the left hand holding gesture according to the determined current holding gesture; and updating the determination model by combining the labelled current detection data into one of the first data set or the second data set in the determination model.

18. The control method as claimed in claim 17, further comprising:

determining whether a modification input is received; and in response to the modification being received, revising the labelled current detection data and updating the determination model.

* * * * *